Sept. 19, 1967  B. McPHADEN ET AL  3,341,933
METHOD OF MAKING A MATRIX FOR MOLDS
Filed Oct. 4, 1962  3 Sheets-Sheet 1

INVENTORS
BRUCE McPHADEN
BY JAMES R. MADDOX

George B White
ATTORNEY

Sept. 19, 1967   B. McPHADEN ET AL   3,341,933
METHOD OF MAKING A MATRIX FOR MOLDS
Filed Oct. 4, 1962   3 Sheets-Sheet 3
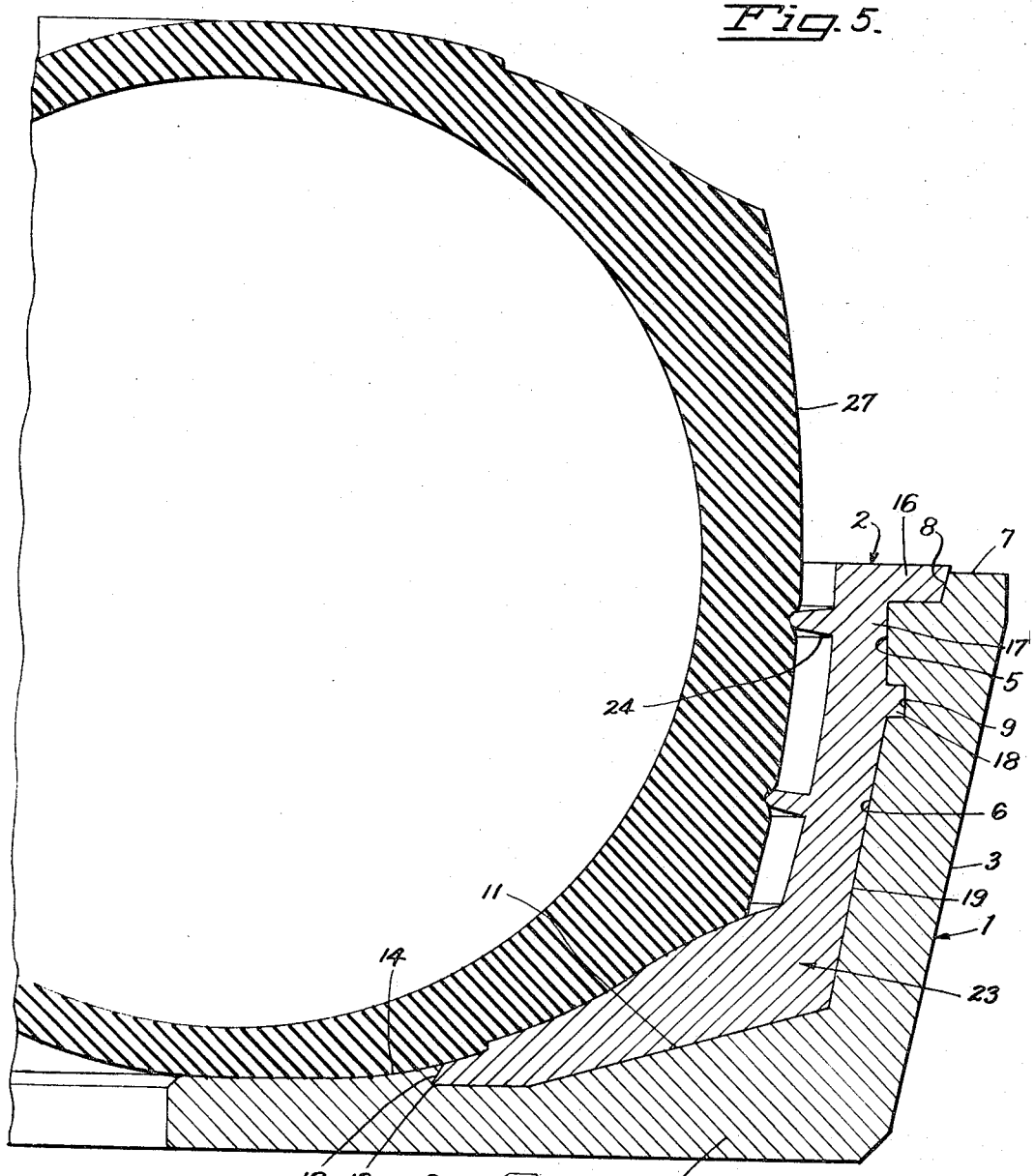
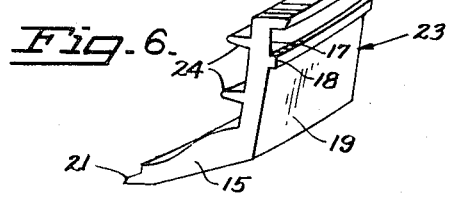
INVENTOR.
BRUCE McPHADEN
BY JAMES R. MADDOX
George B. White
ATTORNEY United States Patent Office 3,341,933
Patented Sept. 19, 1967

3,341,933
METHOD OF MAKING A MATRIX FOR MOLDS
Bruce McPhaden, Alamo, Calif. (739 Allston Way, Berkeley, Calif. 94710), and James R. Maddox, Oakland, Calif., assignors, by mesne assignments, to said Bruce McPhaden
Filed Oct. 4, 1962, Ser. No. 228,347
4 Claims. (Cl. 29—447)

The primary object of the invention is to provide a method of making a matrix for curing treads on tires which is of improved accuracy, and of greater heat conductivity, yet less expensive than similar matrices in the past.

Another object of the invention is to provide a method for making an accurate matrix for curing treads on tires or the like by expanding a band by heat and then shrinking the band on matrix insert means by cooling so as to afford maximum heat conductive contact between the band and the insert means and to utilize the forces generated by the shrinking of the band for tightly pressing and holding the insert in the band.

Another object of the invention is to provide a method for forming a matrix which permits the use of accurately die-cast matrix sections which are positioned loosely but contiguously in a band expanded by heat so as to form a complete circle, then pressing the series of matrix sections into contact with the heated band and with each other and finally cooling the band to shrink over the matrix sections; the contours of the adjacent surfaces of the band and the matrix sections being complemental and formed with interfitting projections and recesses so as to positively press the sections in accurately aligned relation with the band and with each other.

Another object of the invention is to provide a method for making a matrix wherein the adjacent contours of matrix sections and an encircling band are provided with interfitting and interacting projections and recesses to convert the forces created by the shrinking of the heat expanded band on the matrix sections into gripping forces to press and hold the matrix sections in the band; the matrix sections and the band being made of material of the same coefficient of expansion to prevent separation when the matrix is heated for curing tires or the like.

We are aware that some changes may be made in the general arrangements and combinations of the several devices and parts, as well as in the details of the construction thereof without departing from the scope of the present invention as set forth in the following specification, and as defined in the following claims; hence we do not limit our invention to the exact arrangements and combinations of the said device and parts as described in the said specification, nor do we confine ourselves to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 5 is a fragmental cross-sectional view showing the expander expanded and the insert pressed into the conforming contour of the heat expanded band.

FIG. 6 is a perspective view viewing the back of a matrix insert.

Figure 1:
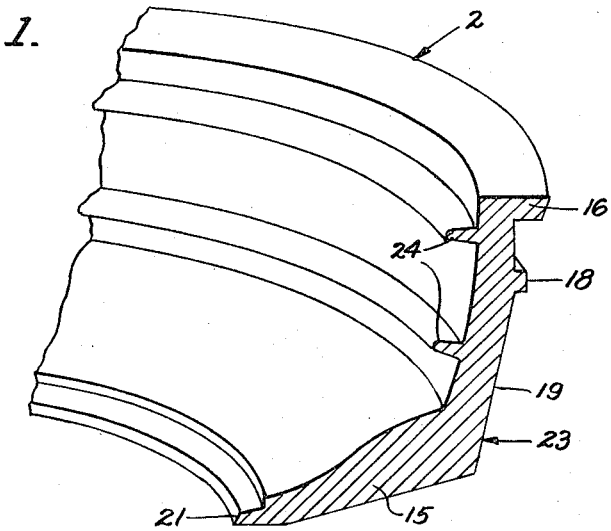
FIG. 1 is a fragmental perspective view of the matrix insert.
Figure 2:
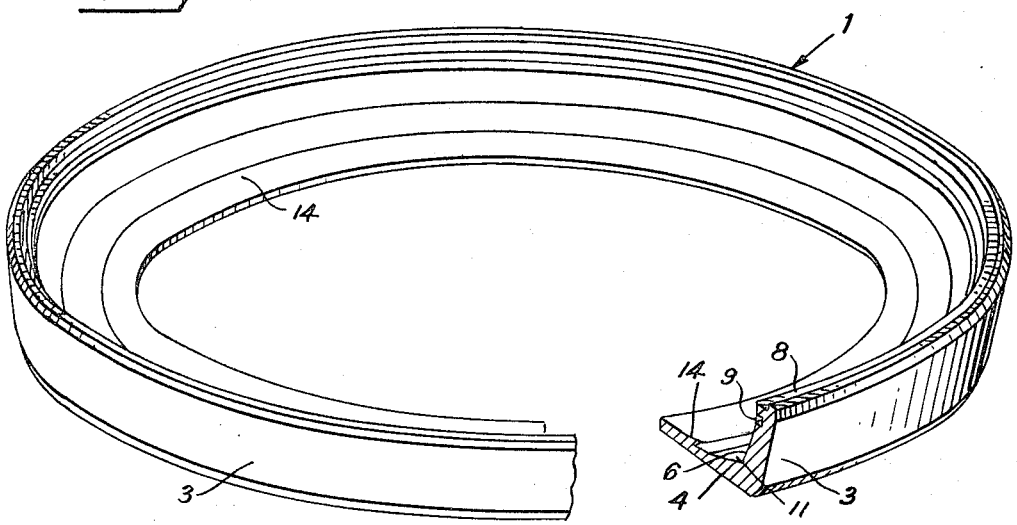
FIG. 2 is a partly sectional fragmental perspective view of the band for the matrix insert.

The matrix of the herein invention is formed of a full circle band 1 and design bearing insert means or matrix insert 2 fitting into the band 1.

The band 1 has a generally cylindrical upright wall 3 from the lower edge of which extends generally radially inwardly a base flange 4.

The contour of the inner surface of the band 1 includes a cylindrical face portion 5 and an inclined annular face 6, slanting inwardly and toward said base flange 4. The top edge 7 of the wall 3 in its inner corner with the cylindrical face 5 has an annular recess 8. Spaced from the recess 8 downwardly and at about the joining line between the cylindrical face 5 and inclined face 6 is an annular groove 9. The tapered inner face 11 of the base flange 4 tapers inwardly away from the wall 3 in continuation of the inclined face 6 and terminates in an annular pocket 12. This pocket 12 faces outwardly toward the wall 3. The pocket 12 terminates in a comparatively sharp corner 13. Above and beyond the pocket 12 the inner surface of the base flange 4 is dished slightly as at 14.

The outer contour of the matrix insert 2 has an inwardly extended shoulder flange 15 at its lower edge and a radially outwardly extending top flange 16 at its top which latter fits into the top recess 8 of the band 1. A cylindrical surface portion 17 of the insert contour fits against the cylindrical face portion 5. An annular rib 18 on said insert contour fits into the annular groove 9 of the band 1. An inclined or slanting surface 19 fits against the inclined face 6 of the band 1. An abutment edge 21 of the shoulder flange 15 fits snugly into the annular pocket 12 of the base flange 4. Thus the outer periphery and contour of the matrix insert 2 is complemental to the inner periphery and contour of the band 1.

The outer circumference and contour of the band 1 is of any suitable shape to fit into the usual mold equipment and may be heated for curing tires in any manner well known in the art of tire making and retreading.

The method of making the matrix herein includes the step of subjecting the band 1 to heat until it is expanded sufficiently to accommodate the insertion of the matrix insert 2 in loose registry with the inner contour of the band 1. Then the matrix insert 2 is positioned in such loosely registering position. Then the band 1 is cooled so that it shrinks over the insert 2 tightly.

In this manner there is complete metal to metal contact all around the complemental contours of the insert 2 and band 1 providing most efficient heat transfer. The band 1 and the matrix insert 2 are made of material of the same coefficient of expansion so that when the entire matrix unit is heated during the tire curing operation the relative expansion of the insert 2 will be the same as that of the band 1 and thus separation is obviated.

The matrix insert 2 may be a single continuous ring or it may be made of several matrix sections.

Figure 3:
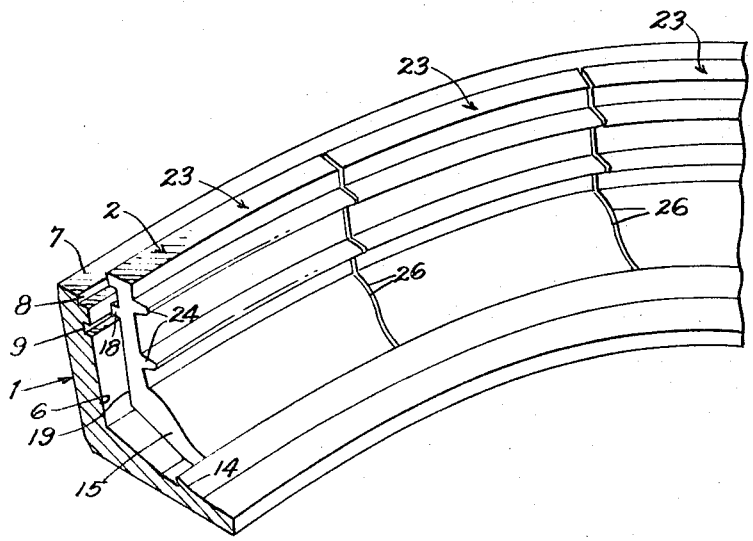
FIG. 3 is a fragmental perspective view of the band with a few of the inserts loosely positioned in the band.
Figure 4:
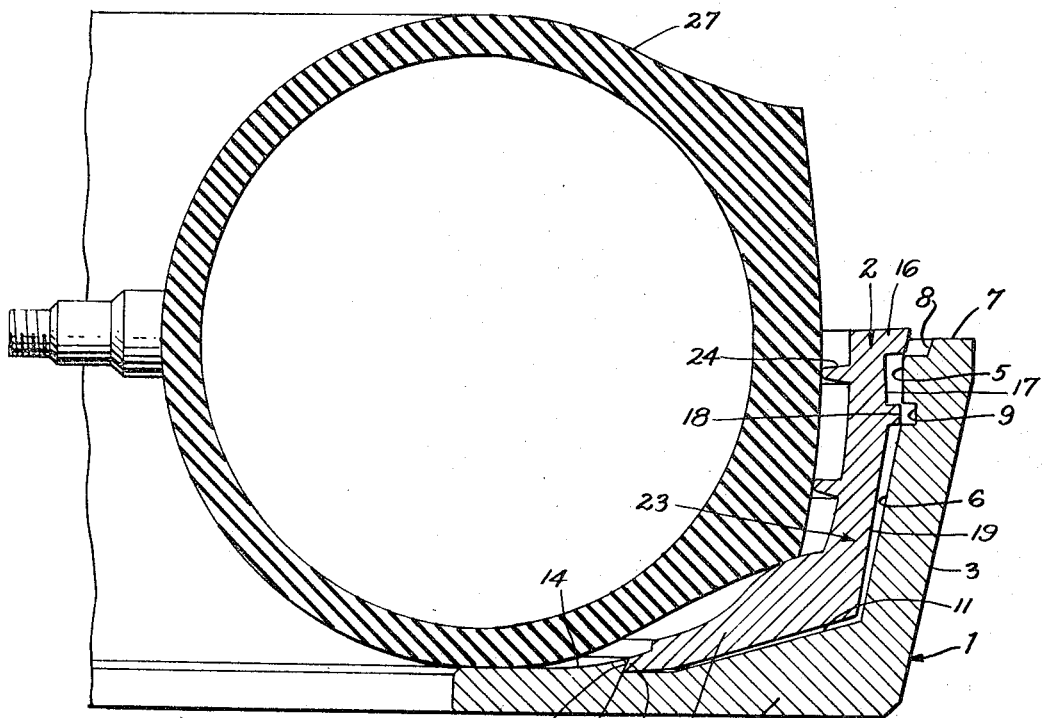
FIG. 4 is a cross-sectional view showing the expander in the initial engagement holding the loose inserts in position.

The matrix sections 23 illustrated in FIGS. 3 and 5 are made of only sufficient width to facilitate production of accurate matrix sections by die casting. These sections have the outside contour heretofore described. Each matrix section 23 has cast on its inner face a portion of the tire tread design 24 projecting from its inner periphery and is made on such arc that sections 23 placed end to end complement each other into a full circle matrix. The number of such sections used depends on the diameter of the tire to be cured in the mold. The ends 26 of each section 23 are so formed as to interfit in butting relation with the ends of adjacent sections 23.

These sections 23 are positioned in the heat expanded band 1 loosely but in sufficient number to fill the space around the inside periphery of the band 1. The abutment edges 21 of the sections are positioned in the annular pocket 12.

Then the sections 23 are held in such position until the band 1 is cooled and contracted so as to tightly engage and squeeze together the sections 23 into a full circle matrix design.

In the present illustration an expander 27 in the form of an inflatable heavy bag in the general shape of a tire is positioned inside the circle of matrix sections 23 and is then inflated to press the sections 23 radially outwardly and thus hold the ribs 18 in registry with the groove 9 and assure proper alignment when the band 1 is contracted. The outer periphery of the expander bag 27 is compresible so that it can bear firmly against the projections of the matrix design 24.

The matrix inserts 23 are cold when inserted into the hot expanded band 1. When the band 1 is cooled and shrunk tightly around the inserts 23 it not only presses the backs of the inserts into intimate contact with the inside of the band 1, but also draws the inserts 23 circumferentially together end to end against one another with such tightness that to all intents and purposes the inserts become a contiguous matrix design and the cracks or spaces between the ends of the inserts 23 is minimized.

In subsequent service the inserts and the band are heated together as a unit to a desired curing temperature and having the same coefficient of expansion, expand together and remain tight.

The annular rib 18 on the inserts 23 being cast in a fixed relation, the matrix design coacts with the annular groove 9 of the band 1 to assure precise alignment of the matrix design of the inserts 23 all around. Once fixed tightly in the band 1 the inserts 23 become permanent parts of the band 1 and cannot be removed or loosened. But if replacement of matrix design is needed the band 1 can be saved by machining the inserts 23 until they are weakened sufficiently to become loose enough for removal, and then a new set of inserts with the changed matrix design can be fixed in place in the manner heretofore described.

The coaction between the parts of the conforming contours of the insert and the band accomplishes intimate metal to metal contact for transference of heat and also the direction of the forces created by the shrinking of the band so as to grip the insert. In the herein illustration the force of shrinking is directed downwardly and inwardly of the band through the interacting groove 9 and rib 18, and generally upwardly and outwardly by the interaction of the pocket 12 of the band and the abutment edge 21 of the insert, and these substantially opposite forces urge and force the insert against the band. The interacting contours of the band and the insert may take various shapes having the necessary characteristics of directing the forces of shrinkage in such directions as to urge the insert against the band.

The matrix made in accordance with the herein invention can be used in molds of various types, and particularly this matrix unit can be used in the manufacture of new tires or in recapping or retreading worn tires. In either case the herein matrix and method result in precision of design alignment, improved heat transfer and savings in costs and material.

We claim:

1. The method of making a matrix for molds comprising
    (a) forming a band and design bearing matrix insert with interfitting respective inner and outer peripheral contours including interfitting projections and recesses in said peripheries, said matrix and said band being made of materials having substantially the same coefficient of expansion
    (b) expanding the band by application of heat to a size to accommodate said projections for insertion of the insert into the band
    (c) inserting said matrix into the expanded band and loosely registering the respective projections and recesses, and
    (d) shrinking the band over said inserted matrix by cooling so as to interlock said interfitting contoured peripheries.

2. The method of making a matrix for molds comprising
    (a) forming a continuous band out of heat expandable matreial
    (b) forming a plurality of complemental design bearing matrix sections fitting end to end into said band so as to form a continuous matrix design
    (c) forming the inner periphery of the band and the outer peripheries of the complemental matrix sections with interfitting contours
    (d) expanding said band by heating to an inner periphery accommodating the insertion of said matrix sections around said inner periphery
    (e) inserting said matrix sections end to end contiguously around the inner periphery of the band, and
    (f) shrinking said band around said contiguous series of matrix sections by cooling the band for interlocking said interfitting contours and pressing said matrix sections together into full circle matrix.

3. The method of making a matrix for molds comprising
    (a) forming a continuous band out of heat expandable material
    (b) forming a plurality of complemental design bearing matrix sections fitting into said band so as to form a continuous matrix design
    (c) forming the inner periphery of the band and the outer peripheries of the complemental matrix sections with interfitting contours
    (d) expanding said band by heating to an inner periphery accommodating the insertion of said matrix sections around said inner periphery
    (e) insertion said matrix section loosely contiguously around the inner periphery of the band
    (f) positioning an expanding element along the inside periphery formed by said contiguous matrix sections
    (g) engaging said expanding element with the inner peripheries of said sections so as to press said sections radially outwardly and against said band
    (h) shrinking said band around said pressed contiguous series of matrix sections by cooling the band for interlocking said interfitting contours
    (i) removing said expanding element after said band is shrunk.

4. The method of making a matrix for molds comprising
    (a) forming a continuous band out of heat expandable material
    (b) forming a plurality of complemental design bearing matrix sections fitting into said band so as to form a continuous matrix design
    (c) forming the inner periphery of the band and the outer peripheries of the complemental matrix sections with interfitting contours
    (d) expanding said band by heating to an inner periphery accommodating the insertion of said matrix tions around said inner periphery
    (e) inserting said matrix sections loosely contiguously around the inner periphery of the band
    (f) positioning an inflatable expander around the inside periphery of said matrix section to hold said sections in position
    (g) inflating said expander to press said matrix sections radially outwardly and press said sections against said band
    (h) shrinking said band around said pressed contiguous series of matrix sections by cooling the band for interlocking said interfitting contours (i) removing said expanding element after said band is shrunk.

References Cited

UNITED STATES PATENTS

| | | | |
|---|---|---|---|
| 1,770,933 | 7/1930 | Leake | 29—447 |
| 1,776,145 | 9/1930 | Bungay | 29—447 |
| 1,943,947 | 1/1934 | Bungay | 18—44 |
| 2,153,741 | 4/1939 | Cobi. | |
| 2,836,855 | 6/1958 | Hawkinson | 18—44 |
| 2,886,851 | 5/1959 | Strickler et al. | 18—44 |
| 3,121,947 | 2/1964 | Knox | 29—447 |

CHARLIE T. MOON, *Primary Examiner.*

A. H. BRODMERBED, *Examiner.*

F. MARLOWE, *Assistant Examiner.*